(12) United States Patent
Liu et al.

(10) Patent No.: US 8,755,633 B2
(45) Date of Patent: Jun. 17, 2014

(54) AUTOMATED SYNCHRONIZED NAVIGATION SYSTEM FOR DIGITAL PATHOLOGY IMAGING

(75) Inventors: Ming-Chang Liu, San Jose, CA (US); Liangyin Yu, Fremont, CA (US); Shigeatsu Yoshioka, Kanagawa (JP); Yoichi Mizutani, Saitama (JP); Masato Kajimoto, Chiba (JP)

(73) Assignee: Sony Corporation, Tokyo (JP)

( * ) Notice: Subject to any disclaimer, the term of this patent is extended or adjusted under 35 U.S.C. 154(b) by 233 days.

(21) Appl. No.: 13/420,095

(22) Filed: Mar. 14, 2012

(65) Prior Publication Data

US 2013/0243302 A1    Sep. 19, 2013

(51) Int. Cl.
*G06K 9/36*    (2006.01)

(52) U.S. Cl.
USPC .......................................... 382/289; 345/649

(58) Field of Classification Search
USPC ......... 382/100, 128–134, 151, 276–278, 287, 382/289, 291–298; 345/619–689
See application file for complete search history.

(56) References Cited

U.S. PATENT DOCUMENTS

| | | | |
|---|---|---|---|
| 6,738,532 B1 * | 5/2004 | Oldroyd ........................ | 382/294 |
| 8,116,551 B2 | 2/2012 | Gallagher et al. | |
| 8,369,600 B2 * | 2/2013 | Can et al. ...................... | 382/133 |
| 2002/0054699 A1 * | 5/2002 | Roesch et al. ................ | 382/131 |
| 2003/0160786 A1 | 8/2003 | Johnson | |
| 2006/0098897 A1 * | 5/2006 | Dewaele ....................... | 382/294 |
| 2007/0019846 A1 | 1/2007 | Bullitt et al. | |
| 2007/0071300 A1 * | 3/2007 | Ching .......................... | 382/129 |
| 2007/0230755 A1 * | 10/2007 | Maddison et al. ............ | 382/128 |
| 2008/0166036 A1 * | 7/2008 | Bloom et al. ................ | 382/133 |
| 2009/0245610 A1 * | 10/2009 | Can et al. ...................... | 382/133 |
| 2010/0215227 A1 * | 8/2010 | Grunkin et al. .............. | 382/128 |
| 2011/0110567 A1 | 5/2011 | Jiang | |
| 2011/0142316 A1 | 6/2011 | Wang et al. | |
| 2011/0299070 A1 | 12/2011 | Christiansen et al. | |
| 2012/0069049 A1 * | 3/2012 | Howe et al. ................... | 345/629 |
| 2013/0016886 A1 * | 1/2013 | Schoenmeyer et al. ....... | 382/128 |

* cited by examiner

*Primary Examiner* — Anand Bhatnagar
(74) *Attorney, Agent, or Firm* — Haverstock & Owens LLP

(57) ABSTRACT

A method for synchronizing navigation in pathology stain images includes (a) downscaling the pathology stain images, (b) estimating rotation of the downscaled images, (c) aligning the downscaled images to generate aligned coordinates, and (d) transforming the aligned coordinates to original image coordinates in the pathology stain images to thereby generate alignment data. Also provided is a system for synchronized navigation in pathology stain images having original resolutions comprising a downscaler, a rotation estimator, an alignment module, and a coordinate transformer. The system may also include an image display system to display corresponding areas of the pathology stain images.

18 Claims, 8 Drawing Sheets

(5 of 8 Drawing Sheet(s) Filed in Color)

AUTOMATED SYNCHRONIZED NAVIGATION SYSTEM FOR DIGITAL PATHOLOGY IMAGING

TECHNICAL FIELD

The present disclosure relates to an automated system for synchronized navigation in digital pathology images, for example, images of tissue samples stained by different methods.

BACKGROUND

Pathological diagnosis often involves slicing a tissue sample (e.g. a biopsy) into thin slices, placing the slices on individual slides, and staining the slices with different methods and reagents. For example, a tissue sample slice may be stained by hematoxylin and eosin (H&E) stain for visualizing histological structures of the sample, while an adjacent tissue sample slice may be stained by immunohistochemical (IHC) stain with a disease-specific antibody. Pathologists commonly perform initial diagnosis on H&E stained samples and then order IHC staining from the same biopsy block for validation and prognosis.

With the trend of digitization, specimen slides are often scanned into digital images (virtual slides) for later viewing on monitors. To make a final diagnosis, pathologists need to simultaneously examine a region of interest on an H&E image and its corresponding area on an IHC image(s) from the same biopsy block. Thus, those stain images need to be accurately aligned on the monitor(s) and synchronized viewing and navigation need to be achieved across the images regardless of magnification.

To align such stain images is challenging, since there is often a great difference in image appearance between two adjacent sample slices stained by different methods, and various local deformations are involved. Adjacent samples are often not related by simple transformation, and structural changes are unpredictable across adjacent samples and different magnification. For example, two stain images obtained from adjacent but different parts of a tissue block may have ill-defined structural correspondence. The stain images may have also weak structures that need to be made explicit in order to align whole images. Furthermore, because tissue slices may be stretched or deformed during sample handling, different parts of each image may transform differently from other parts of the same image.

Furthermore, tissue sample placement may also pose challenges for alignment and synchronized navigation in pathology stain images. For example, tissue samples may be placed in different orientations and the rotation centers of the images are unknown (FIG. 1A). The tissue samples may also be placed in different locations on the slides stained by different methods and the images may have very different sizes (FIG. 1B).

Existing systems for image alignment and navigation require the user to manually locate corresponding areas on the virtual slides (images) due to the problems discussed above. This process has to be redone when the user navigates away from the aligned regions or at different resolutions. Those manual adjustments may require zooming in/out and seeking relevant clues with expert knowledge in order to correctly locate corresponding areas. For very large images (e.g. 100 k×100 k), the manual process is tedious and impractical. In addition, when the images are examined locally at a high resolution, the appearance between corresponding regions diverges rapidly and it becomes difficult to find matching points.

Therefore, there is a need to develop methods and systems for automated synchronized navigation in pathology stain images which are similar in global appearance but have local deformations and varied tissue sample placements, for example, large images of tissue samples stained by different methods.

SUMMARY

The present disclosure includes an exemplary method for synchronizing navigation in pathology stain images. Embodiments of the method include (a) downscaling the pathology stain images, (b) estimating rotation of the downscaled images, (c) aligning the downscaled images to generate aligned coordinates, and (d) transforming the aligned coordinates to original image coordinates in the pathology stain images having original resolutions to thereby generate alignment data. Embodiments of the method may also include displaying corresponding areas of the pathology stain images based on the alignment data.

An exemplary system for automated synchronized navigation in pathology stain images in accordance with the present disclosure comprises a downscaler to detect tissue areas and downsample the pathology stain images; a rotation estimator to determine rotation angle and rotate the downscaled images; an alignment module to align the downscaled images to generate aligned coordinates; and a coordinate transformer to transform the aligned coordinates to original image coordinates in the pathology stain images to thereby generate alignment data. The exemplary system for automated synchronized navigation in pathology stain images may also comprise a display system to display corresponding areas of the pathology stain images based on the alignment data.

Also provided is an exemplary computer system for synchronized navigation in pathology stain images, comprising: one or more processors configured to execute program instructions; and a computer-readable medium containing executable instructions that, when executed by the one or more processors, cause the computer system to perform a method for synchronizing navigation in pathology stain images, the method comprising: (a) downscaling the pathology stain images, (b) estimating rotation of the downscaled images, (c) aligning the downscaled images to generate aligned coordinates, and (d) transforming the aligned coordinates to original image coordinates in the pathology stain images to thereby generate alignment data. The method may further comprise displaying corresponding areas of the pathology stain images based on the alignment data.

It is to be understood that both the foregoing general description and the following detailed description are exemplary and explanatory only and are not restrictive of the invention, as claimed.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

The methods and systems disclosed herein have many practical applications. For example, exemplary embodiments may be used to automatically navigate, in a synchronized manner, multiple large images of tissue samples stained by different methods. By downscaling and correcting tissue placement variations before aligning the images, and then transforming the aligned coordinates back to the original image coordinates, the methods and systems disclosed herein may achieve automated navigation in different resolutions and bring corresponding areas in the images into synchronized views. The methods and systems disclosed herein may be used not only for purposes of pathological diagnosis, but also for synchronized navigation in any images that are similar in global appearance but contain local changes or placement variance, for example, satellite images of the same scene from different viewpoints.

In the paragraphs that follow, the terms "IHC image" and "H&E image" are frequently used for illustrative purposes. They are meant to refer generally to any pathology stain images to be aligned, and not to be limited literally to an IHC or H&E image.

Figure 1:
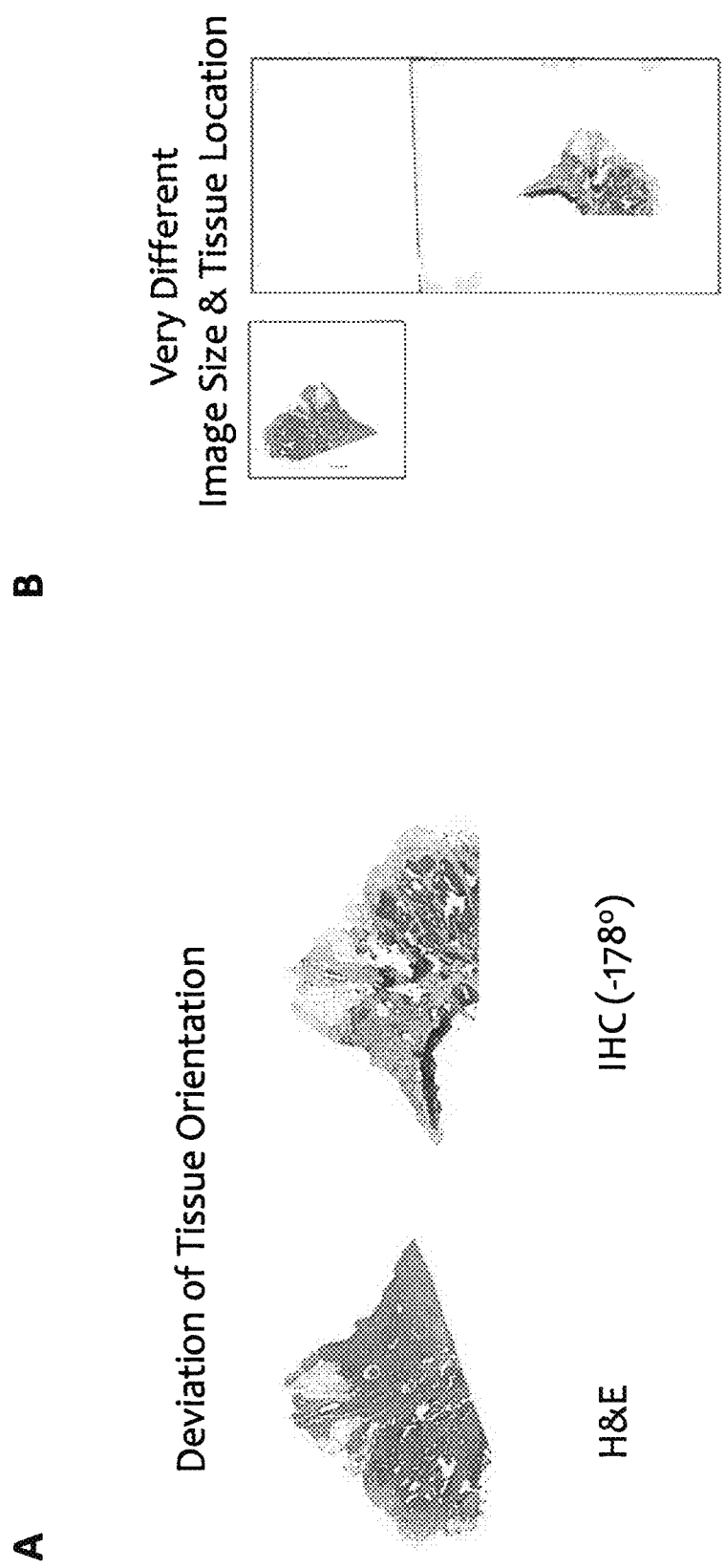
FIG. 1A shows an example of deviation of tissue orientation, due to tissue placement, in three stain images of adjacent tissue samples, stained by H&E (left), IHC with PR antibody (middle), and IHC with HER2 antibody (right), respectively.
FIG. 1B shows stain images of two adjacent tissue samples stained by different methods and having different image size and tissue location, due to tissue placement.
Figure 2:
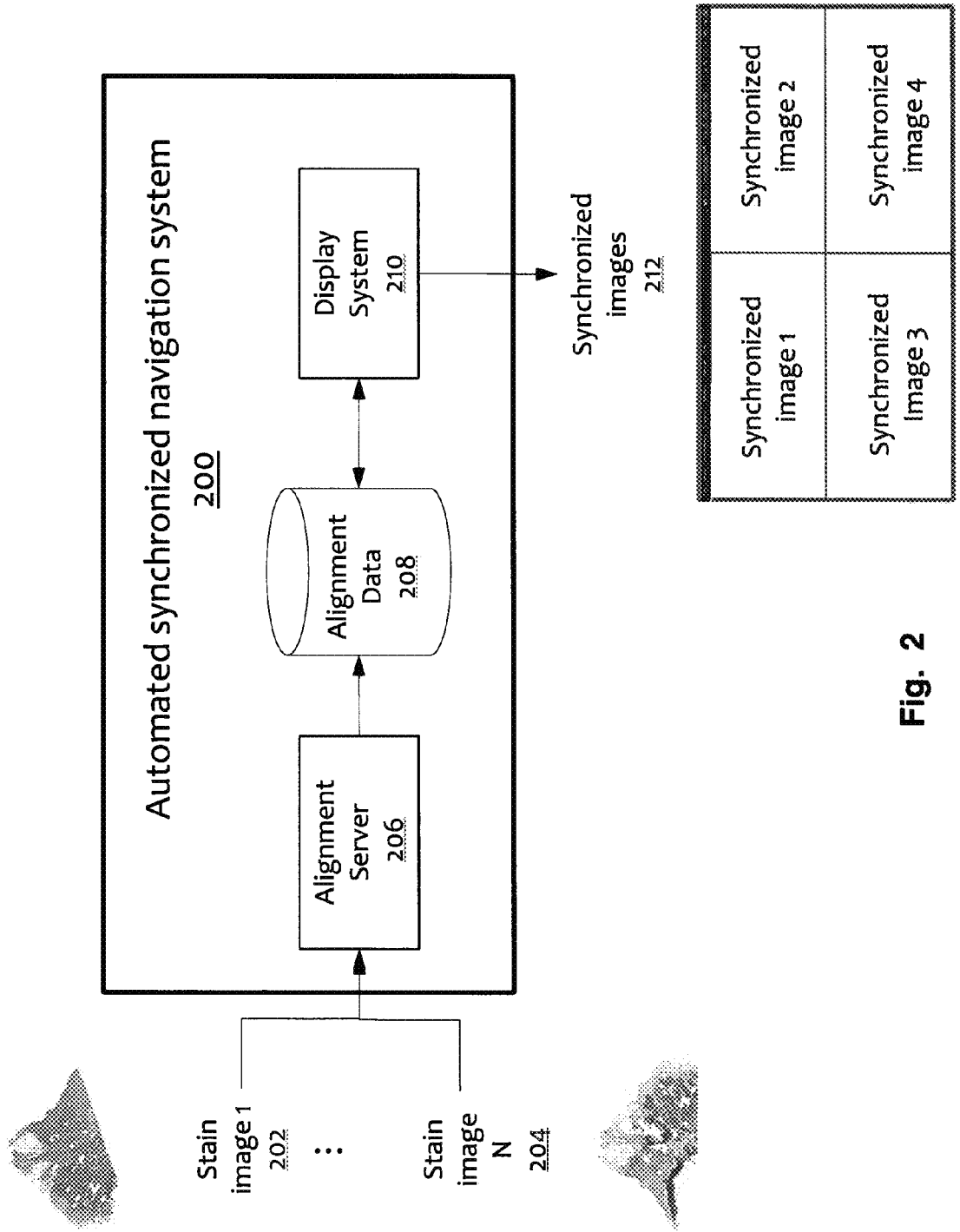
FIG. 2 illustrates a block diagram of an exemplary automated synchronized navigation system consistent with the invention.

FIG. 2 illustrates a block diagram of an exemplary automated synchronized navigation system 200 consistent with the invention. As shown in FIG. 2, the system may comprise an alignment server (206) and a display system (210). Alignment Server 206 may receive at least two stain images (202 and 204) and generate alignment data (208) for the stain images. The Alignment Server may comprise one or more computers, computer systems, programmable processors, or any other devices that may be used to process large pathology stain images. The Alignment Server may be implemented as a software program executed in a processor(s) and/or as hardware that performs image alignment based on image content.

Display System 210 may, based on the alignment data, display images of corresponding regions of interest from the pathology stain images in a synchronized manner. For example, in some embodiments, when the user moves the pointer, or curser, of a computer mouse to a point in one stain image and/or signals that the area around the curser is a region of interest, the Display System may automatically locate the corresponding areas in the other stain image(s) and display the corresponding areas.

Display System 210 may comprise one or more display devices. The Display System may be, for example, one or more computers, personal digital assistants (PDA), cell phones or smartphones, laptops, desktops, tablet PC, media content players, set-top boxes, television sets, video game stations/systems, or any electronic device capable of accessing a data network and/or receiving data and display images. In some embodiments, Display System 210 may be, a television(s), monitor(s), projector(s), display panel(s), video game stations/systems, or any other display device(s) capable of providing graphical user interfaces (GUI). In some embodiments, The Display System may comprise one or more computers, or programmable processors, etc. for processing and management of the alignment data. In some embodiments, the Display System may comprise a software program executed in a processor(s) to allow automated synchronized navigation of pathology stain images.

Alignment Server 206 and/or Display System 210 may also comprise a database or data management system for storing and retrieving, for example, image data (202 and 204) and alignment data (208).

Alignment Server 206 and Display System 210 may be operatively connected to one another via a network or any type of communication links that allow transmission of data from one component to another, whether wired or wireless. The network may include Local Area Networks (LANs) and/or Wide Area Networks (WANs), and may be wireless, wired, or a combination thereof.

Figure 3:
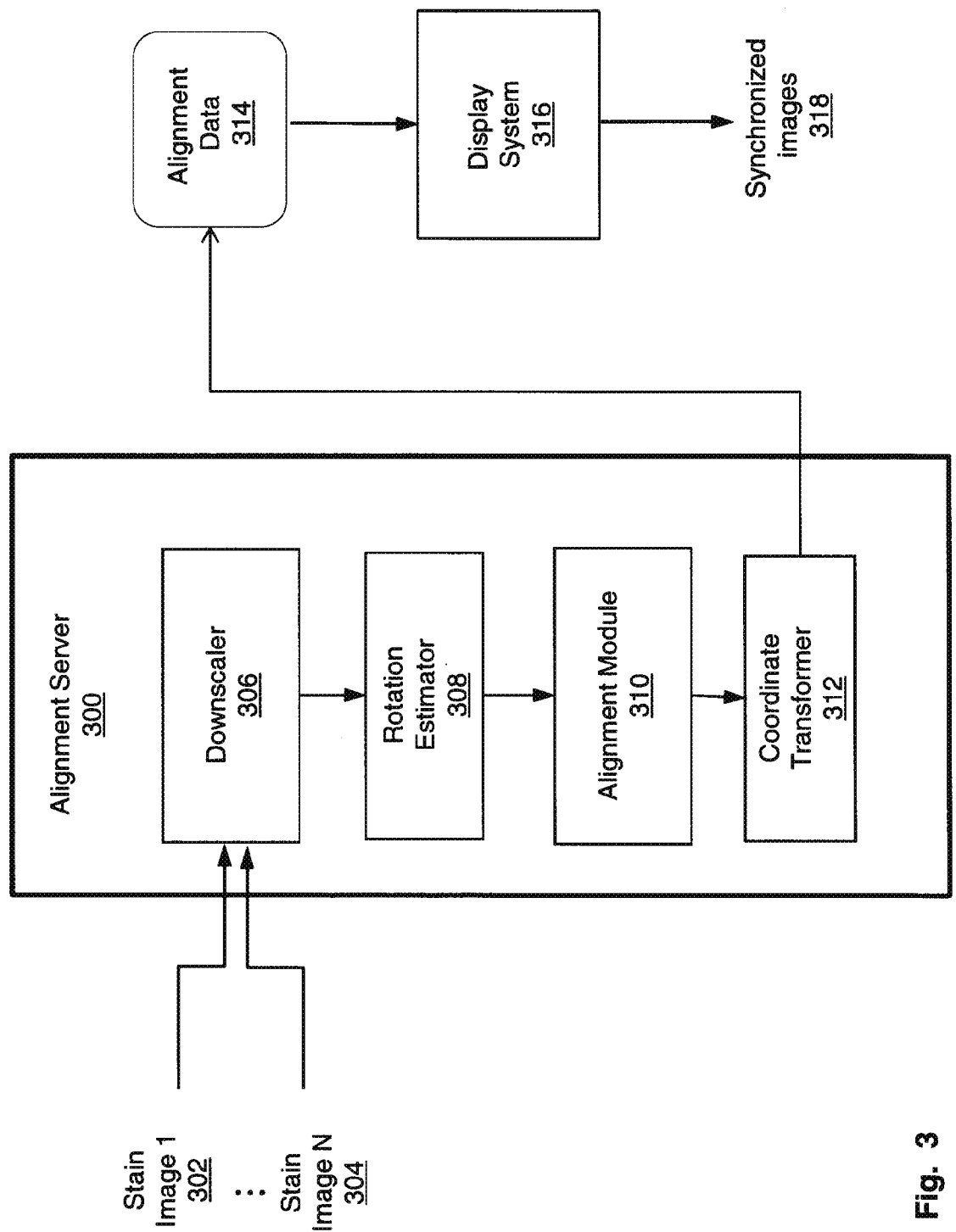
FIG. 3 shows an exemplary alignment server in an exemplary automated synchronized navigation system.

FIG. 3 shows an exemplary alignment server (300) in an exemplary automated synchronized navigation system. As shown in FIG. 3, the exemplary alignment server may comprise a Downscaler (306), a Rotation Estimator (308), an Alignment Module (310), and a Coordinate Transformer (312). The various components of the alignment server may be implemented as a software program(s) executed in a processor(s) and/or as hardware that performs image processing and/or alignment based on image content.

In some embodiments, Downscaler 306 may be configured to detect tissue areas in the pathology stain images. In some embodiments, Downscaler 306 may downscale the pathology stain images to suitable resolutions for aligning the pathology stain images. In some embodiments, Rotation Estimator 308 may be configured to estimate rotation angle for an image against a reference image, and rotate the image by that angle. Alignment Module 310 may be configured to determine correspondent point features between the downscaled images, create triangular meshes for the downscaled images from the correspondent point features, and generate aligned coordinates through affine transformation based on the triangular meshes. Coordinate Transformer 312 may be used to map the aligned coordinates back to original image coordinates at the original resolutions and in the original orientations. In some embodiments, Coordinate Transformer 312 may generate alignment data from the mapped original image coordinates through affine mapping and triangulations on the original image coordinates.

Figure 4:
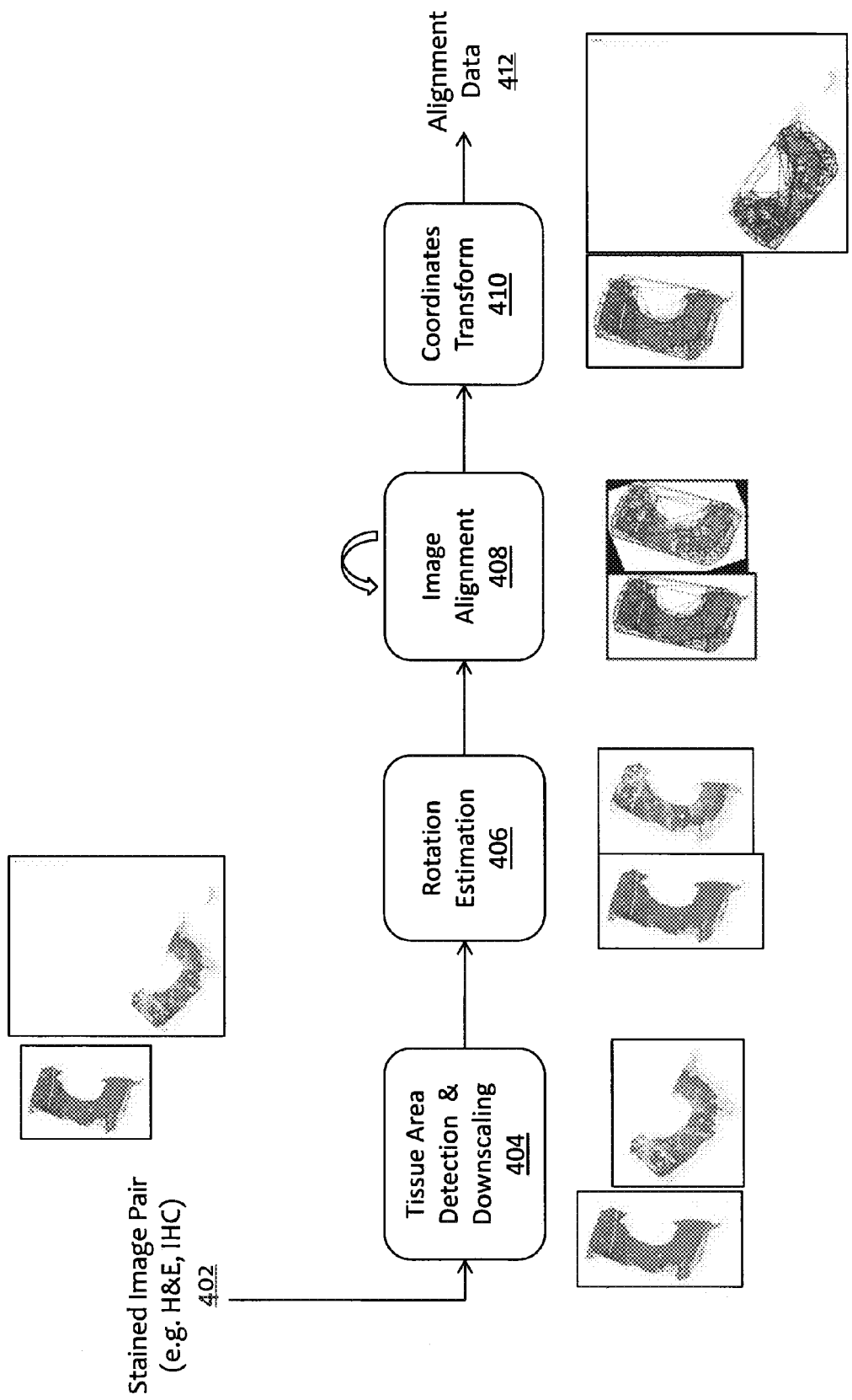
FIG. 4 shows a flow chart illustrating an exemplary method consistent with the presently-claimed invention.

FIG. 4 shows a flow chart illustrating an exemplary method that may be carried out by the various components of the Alignment Server. As shown in FIG. 4, at least two pathology stain images may be received which have original resolutions (402), for example, an H&E stain image and one or more IHC images stained by disease-indicating antibodies. The images may be received from an image capturing device(s) or a network or local storage medium (or media). As exemplified in FIG. 4, in some embodiments, the tissue samples may be positioned in different orientations and/or different locations in the pathology stain images. The pathology stain images may also have different resolutions.

Figure 5:
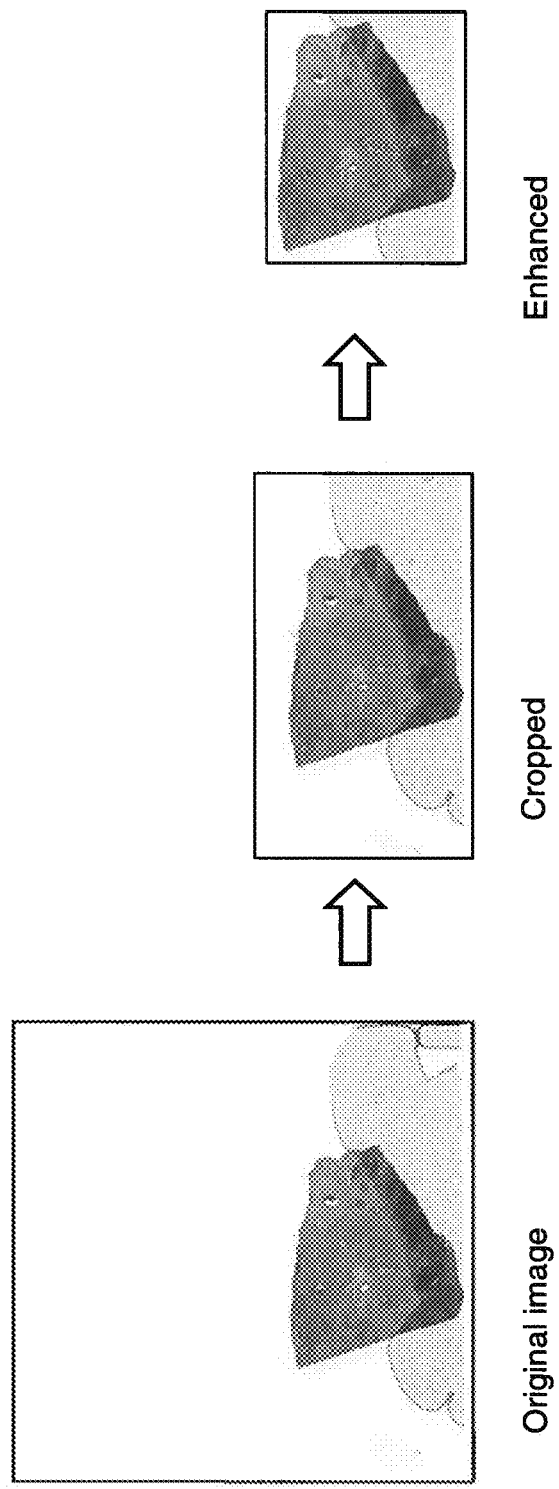
FIG. 5 shows an example of image pre-processing.

Thus, in general, the Downscaler may be configured to detect the tissue areas in the stain images (step 404). In some embodiment, the images may be subjected to pre-processing, including, for example, cropping and/or enhancing, such that the images are suitable for image alignment by the Alignment Module (FIG. 5). Referring back to FIG. 4, in some embodiment, suitable resolutions may be determined based on the memory resource of the computer-based alignment server, and the stain images may be downdsampled (downscaled) to the determined resolutions (step 404). Suitable resolutions may include, but are not limited to, for example, 400×400, 800×800, 1200×1200, 1600×1600, 2000×2000, and 2400×2400.

Since the tissue samples may be positioned in different orientations in the pathology stain images, the Rotation Estimator may be configured, as shown in FIG. 4, to estimate rotation angle at which one of the stain images may be rotated such that it aligns in general in orientation with another stain image ("reference image") (step 406). In some embodiments, an H&E image may serve as a reference image, while the other image(s), for example, an IHC image(s), may be rotated to be aligned with the reference image with respect to orientation.

Figure 6:
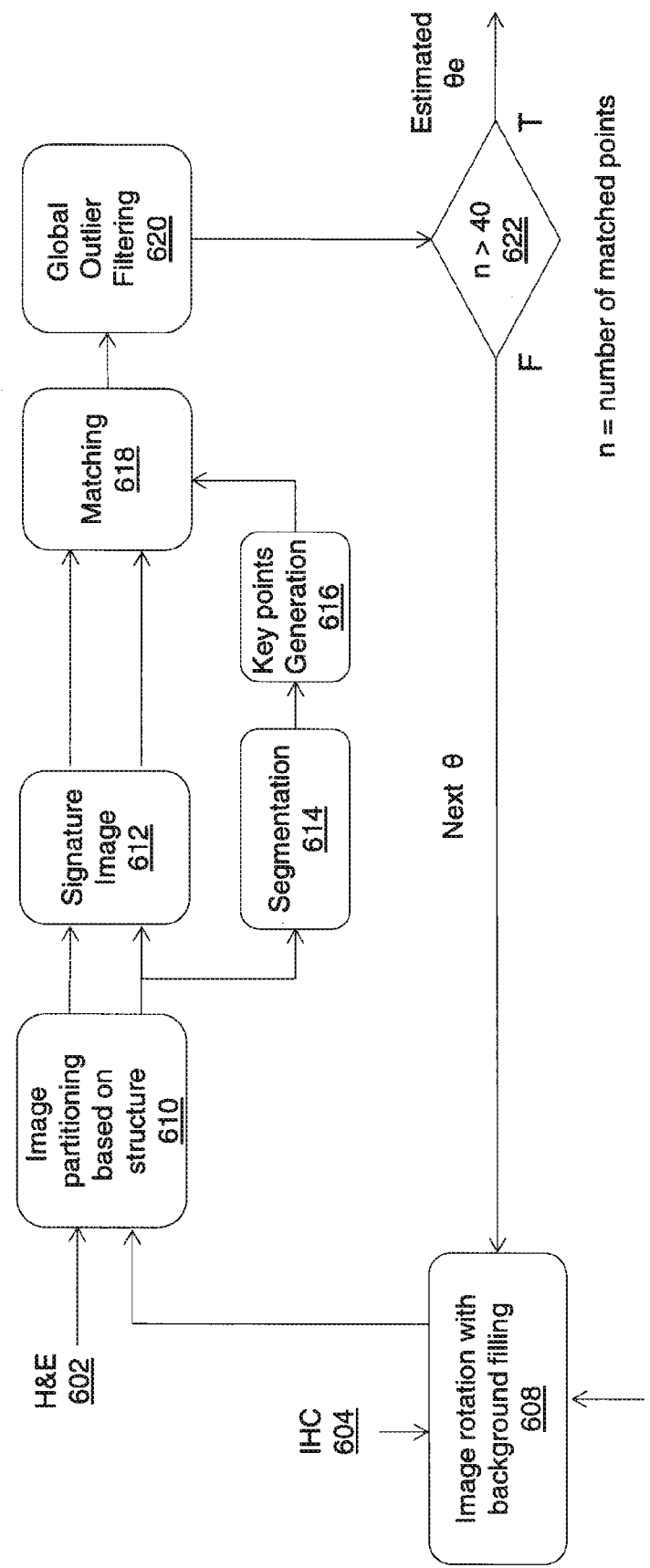
FIG. 6 shows a flow chart illustrating exemplary rotation estimation.

FIG. 6 shows a flow chart illustrating an exemplary method for rotation estimation. In some embodiments, to determine the rotation angle for an image against a reference image, one or more candidate rotation angles θ may be selected and tested. The selection of the candidate rotation angle θ may be prioritized for efficiency. An exemplary prioritization order may be 0°, 180°, ±10°, and so on.

The candidate rotation angle may be verified by rotating the image by the candidate rotation angle (step 608) and then determining how well that image aligns with the reference image after the rotation (steps 610-622). The rotation of the image may be followed by background filing and translation compensation to compensate for the tissue placement deviation caused by the rotation.

FIG. 6 exemplifies an image alignment method for determining matched point features between the rotated image and the reference image. However, other image alignment methods may also be employed, such as the image alignment methods described in U.S. patent application Ser. No. 13/410,960, filed Mar. 2, 2012, which is incorporated herein by reference in its entirety. In principle, the parameters of any alignment method used during rotation estimation may be adjusted to allow expedient verification of the candidate rotation angle.

As shown in FIG. 6, the images may be partitioned into a plurality of sub-image windows (step 610), which may be individually processed to extract point features and to match the point features between the images. Image partitioning may be based on any criteria fit for the image. For example, the reference image, such as an H&E stain image (602), may be partitioned based on the structural density of the image. In some embodiments, the stain of H&E or other reagent(s) may be separated before the image is partitioned. In the partitioned signature image (612), the sub-image windows may be each centered on a structural feature. The size of a sub-image window may be any size that is desirable for point feature extraction and/or matching determination, for example, 100×100, 200×200, 300×300, 400×400, 500×500, 600×600, 800×800, 900×900, or 1000×1000.

Meanwhile, the rotated image, for example, an IHC image, may be partitioned into correspondent sub-image windows of the same size. In some embodiments, the IHC image may be partitioned based on direct image coordinate correspondence between the IHC and the H&E reference images.

Next, keypoints may be generated for the sub-image windows by analyzing the content of the sub-image windows (616). Any image processing method fit for the image may be used to generate keypoints, such as maximum curvature detection. As exemplified in FIG. 6, keypoints may be generated for the sub-image windows in the IHC image based on maximum curvature detection after image segmentation (614).

The keypoints may be cross-matched to the correspondent sub-image window in the reference image (step 618). In some embodiments, correspondence of a keypoint in the other image may be determined by cross correlation, for example, normalized cross correlation. The matched keypoints are referred to as matched point features.

In some embodiments, the matched point features may be filtered to eliminate false matches or outliers (step 620). For example, line segments connecting matched points between two images may be drawn. Theoretically the lines would be all parallel if the matched points are all true. Thus, a non-parallel line connecting matched points indicates that the matching is false and the matched points should be discarded as outliers.

To verify the candidate rotation angle, the number of matched point features obtained above may be compared to a predetermined value (step 622). If the number of matched point features is greater than the predetermined value, the candidate rotation angle may be verified as the rotation angle for proceeding to the next step. Otherwise a new candidate rotation angle may be selected and tested as discussed above. The predetermined value may be any integer that achieves rotation angle accuracy within 10 degrees, for example, 20, 40, 60, 80, 100, 200, 400, 1000, or any integer between 1 and 1000. In some embodiments, the predetermined value may be 40.

In addition, the alignment method may be designed to identify enough matched point features to cover at least 20%, 30%, 40%, 50%, 60%, 70%, or 80% coverage of the images. In some embodiments, the parameters of the method may be adjusted to achieve at least 40% coverage of the images.

Next, referring back to FIG. 4, the images that have been processed by the Downscaler and the Rotation Estimator may be aligned by the Alignment Module to generate aligned coordinates (step 408). In some embodiments, correspondent point features may be determined between the images. Triangular meshes, for example, Delaunay triangulations, may be created from the correspondent point features. Aligned coordinates within the triangles of correspondent triangle pairs may be generated through affine transformation based on the triangular meshes. In some embodiments, the correspondent point features between the images may be further refined based on affine transformation estimation using the triangular meshes. Refined triangular meshes may be created for the images from the refined correspondent point features. And aligned coordinates may generated through affine transformation based on refined triangular meshes. Detailed descriptions of exemplary methods of image alignment and working examples may be found in U.S. patent application Ser. No. 13/410,960. Other algorithms or methods suitable for automatically generating aligned coordinates for digital pathology images may also be employed by the Alignment Module.

In some circumstances, the number of aligned coordinates between two images may be so large as to render the performance of the system undesirable. Thus, in some embodiments, the number of aligned coordinates may be controlled. For example, if more than a predetermined number of aligned coordinates are generated, the alignment module may adjust the parameter(s) and re-align the images using the adjusted parameters. The predetermined number may be, for example, determined by the system implementing the method. For example, the predetermined number may be 1000, 2000, 3000, 4000, 5000, or any integer in between those numbers.

Next, since rotation estimation and image alignment may be carried out with downscaled images, the aligned coordinates may need to be mapped back to the original images at the maximum resolution such that the automated navigation system described herein can scale alignment information on the fly for the image viewer(s) or monitor(s). Referring back to FIG. 4, Coordinate Transformer may convert the aligned coordinates back to the original image coordinates of the images at the original resolutions and in the original orientations (step 410). The resulting alignment data (412) are then passed on to the Display System for image display and user-initiated image navigation.

Figure 7:
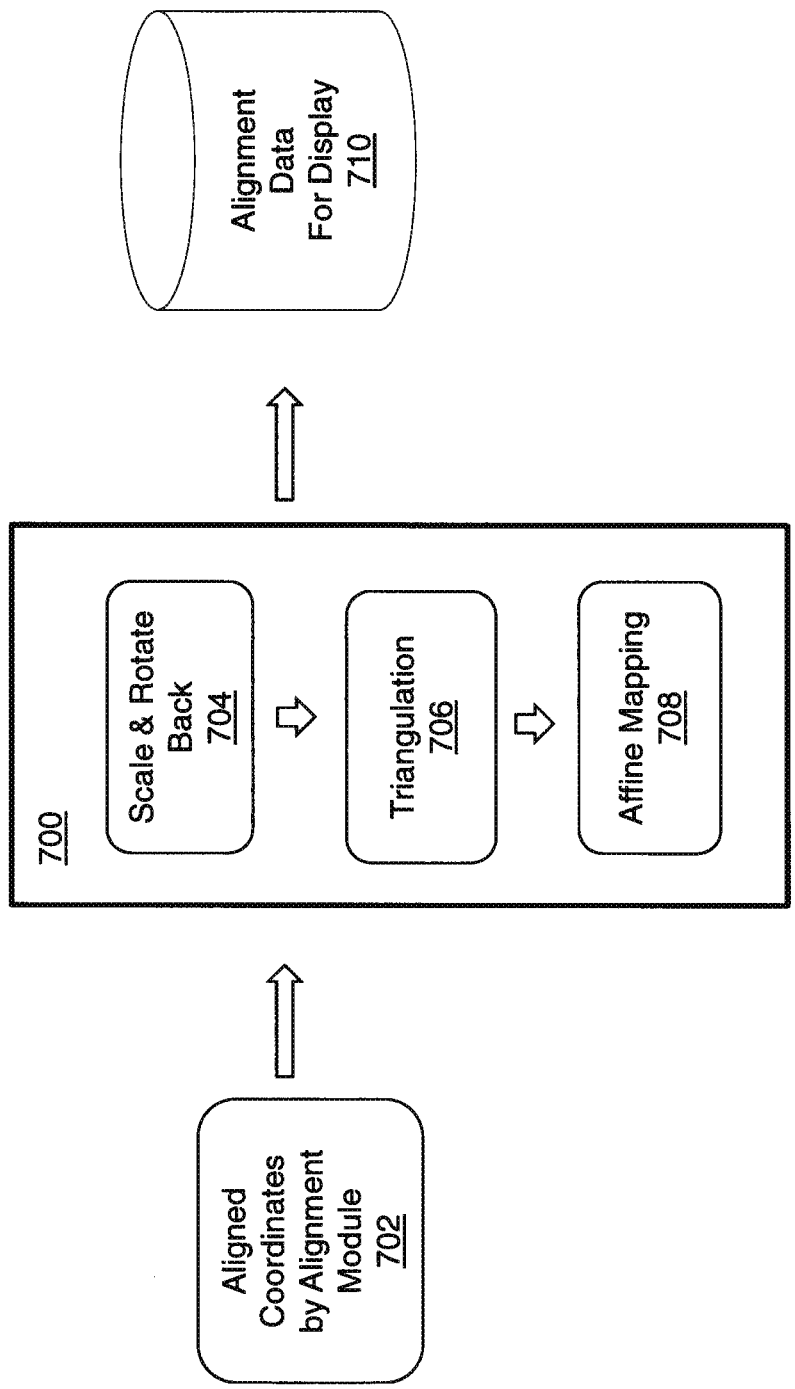
FIG. 7 shows a flow chart illustrating an exemplary coordinate transformer.

FIG. 7 shows a flow chart illustrating an exemplary Coordinate Transformer 700. Based on the parameters used for the earlier step of downscaling (downsampling), as well as the rotation angle at which the image(s) was rotated with respect to the reference image, Coordinate Transformer 700 may inversely scale and rotate the aligned coordinates (702), generated by the Alignment Module, back to original coordinates in the images with respect to the original orientations and the original resolutions (step 704). The resulting original coordinates may be used to recalculate triangular meshes for respective images (step 706). In some embodiments, the triangular meshes may be Delaunay triangulations. The Coordinate Transformer may, through affine mapping, determine matched points within the triangular meshes (step 708). For example, coordinates within the areas of pairs of correspondent triangles in the triangular meshes may be matched through interpolation of affine transformation on the pairs of correspondent triangles. The Coordinate Transformer may output alignment data 710, which include, but are not limited to, matched points between the images, triangles for the respective images, mapping functions for the respective images, and rotation angle(s) of the images.

In some embodiments, the alignment data may be stored in the Alignment Server. The Display System may obtain the alignment data from the Alignment Server for synchronized navigation and display of the pathology stain images. In some embodiments, the alignment data, once generated by the Coordinate Transformer, may be passed on to the Display System for storage. In general, the alignment data may be stored together with the original images for expedient retrieval and display.

Display System may comprise one or more monitors or image display devices for the user to navigate multiple images simultaneously. For example, the user may navigate to and focus on a region of interest in one stain image, and simultaneously view the corresponding regions in the other stain images at such resolutions to allow detailed analysis. FIG. 8A illustrates how four pathology stain images, including an H&E image and three IHC images stained for estrogen receptor (ER), HER-2, and progesterone receptor (PR), respectively, may be synchronized on an monitor(s). As exemplified in FIG. 8A, the user may use the H&E image as a reference image to see the structural features of a region of interest in the tissue sample, and in the mean time, view the corresponding regions in the IHC images to analyze presence and distribution of specific antigens.

FIG. 8B. shows a flow chart illustrating exemplary synchronization of multiple stain images. The user may manipulate a stain image in any manner. For example, the user may manipulate a stain image by moving the cursor of, for example, a mouse or any other pointing device, in that stain image such that a certain area of the image is displayed. In some embodiments, the user may specify the point of the cursor to be the center of the image area to display. In some embodiments, the user may specify an area in the image to focus on and display.

Figure 8:
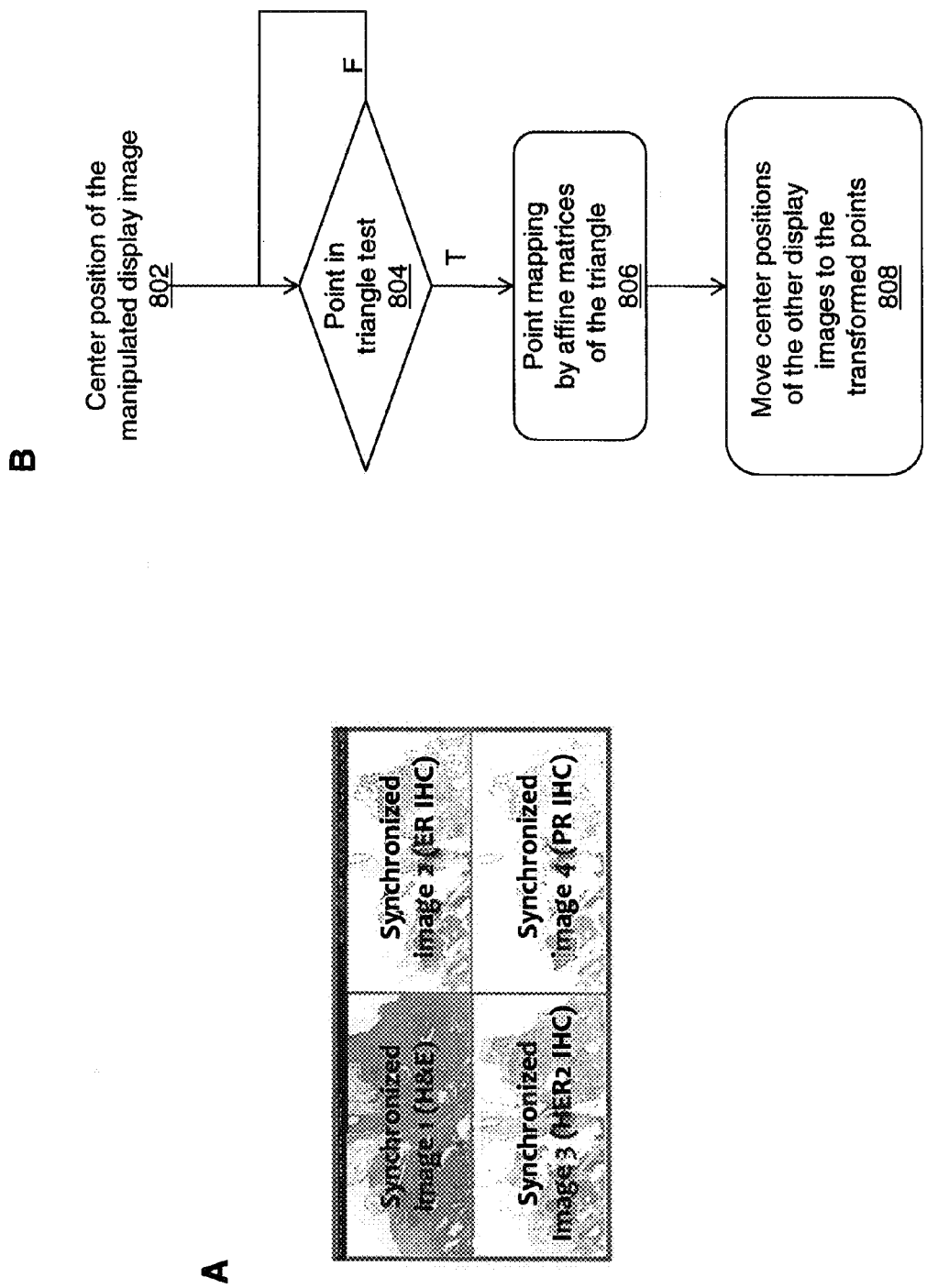
FIG. 8 shows an example of synchronized images (A) (the stain images shown are for illustration purposes only and are not actual stain images as labeled), and a flow chart illustrating exemplary synchronized display of multiple pathology stain images (B).

As shown in FIG. 8, once Display System 210 determines the center position (point) of the manipulated, or displayed, image area (802), that point may be mapped to a triangle of the same image as stored in the alignment data described herein (step 804). The stored triangles of the image may be iterated to determine if center position 802 falls within the triangle until the correct triangle is identified. Once the triangle containing center position 802 is determined, the point is transformed to points in the other images through affine transformations of the triangle (step 806), which are stored in the alignment data.

In some embodiments, triangle mapping and point transformation are carried out by Display System. In some embodiments, those functions may be carried out by another component of the navigation system.

The Display System then moves the center position(s) of the other image(s) to the transformed points (808) and display the images. Since the Alignment Server pre-computes the alignment data, which is stored before images are navigated and displayed, the Display System may quickly access the data, determine correspondent regions of interest, and display them in an automated and synchronized manner.

As shown in FIG. 8A, more than two images may be synchronized by the disclosed embodiments. In some embodiments, one of the images, for example, an H&E image, may serve as a reference image. The center of the manipulated image on display, for example, an ER IHC image, may be transformed to a point in the H&E image through stored affine transformations, and the transformed point in the H&E image may be transformed again to a point to another IHC image, e.g. PR IHC image, through stored affine matrices. Thus, in some embodiments, multiple images may be synchronized through a reference image. When a new stain image is provided to the automated navigation system, the Alignment Server may compute alignment data only for the new stain image against the reference image, and store the alignment data together with the alignment data generated for other existing images.

Pathology images, including IHC and H&E images, are merely exemplary images. Any types of images consistent with disclosed embodiments may also be candidates for automated and synchronized navigation using the methods and systems disclosed herein with modifications and changes without departing from the broader spirit and scope of the invention.

It is understood that the above-described exemplary process flows in FIGS. 2-4 and 6-8 are for illustrative purposes only. Certain steps may be deleted, combined, or rearranged, and additional steps may be added.

The methods disclosed herein may be implemented as a computer program product, i.e., a computer program tangibly embodied in a non-transitory information carrier, e.g., in a machine-readable storage device, or a tangible non-transitory computer-readable medium, for execution by, or to control the operation of, data processing apparatus, e.g., a programmable processor, multiple processors, a computer, or multiple computers. A computer program may be written in any appropriate form of programming language, including compiled or interpreted languages, and it may be deployed in various forms, including as a standalone program or as a module, component, subroutine, or other unit suitable for use in a computing environment. A computer program may be deployed to be executed on one computer or on multiple computers at one site or distributed across multiple sites and interconnected by a communication network.

A portion or all of the methods disclosed herein may also be implemented by an application-specific integrated circuit (ASIC), a field-programmable gate array (FPGA), a complex programmable logic device (CPLD), a printed circuit board (PCB), a digital signal processor (DSP), a combination of programmable logic components and programmable interconnects, a single central processing unit (CPU) chip, a CPU chip combined on a motherboard, a general purpose computer, or any other combination of devices or modules capable of performing automatic image navigation disclosed herein.

In the preceding specification, the invention has been described with reference to specific exemplary embodiments. It will, however, be evident that various modifications and changes may be made without departing from the broader spirit and scope of the invention as set forth in the claims that follow. The specification and drawings are accordingly to be regarded as illustrative rather than restrictive. Other embodiments of the invention may be apparent to those skilled in the art from consideration of the specification and practice of the invention disclosed herein.

What is claimed is:

1. A computer-implemented method for synchronizing navigation in pathology stain images, the method comprising the steps performed by one or more computers of:
   (a) downscaling the pathology stain images;
   (b) estimating rotation of the downscaled images, wherein estimating rotation comprises:
      selecting a candidate rotation angle;
      rotating one of the downscaled images by candidate rotation angle;
      aligning, after the rotating, the downscaled images to determine matched point features between the downscaled images; and
      selecting a final rotation angle based on the number of matched point features;
   (c) aligning the downscaled images to generate aligned coordinates; and
   (d) transforming the aligned coordinates to original image coordinates in the pathology stain images to thereby generate alignment data.

2. The method of claim 1, wherein (a) downscaling the pathology stain images comprises:
   detecting tissue areas in the pathology stain images;
   determining suitable resolutions for aligning the pathology stain images; and
   downscaling the pathology stain images to the determined resolutions.

3. The method of claim 1, wherein estimating rotation further comprises filtering out false matched point features.

4. The method of claim 1, further comprising:
   filling in background for the rotated image; and
   compensating translation for the rotated image.

5. The method of claim 1, wherein (c) aligning the downscaled images comprises:
   determining correspondent point features between the downscaled images;
   creating triangular meshes for the downscaled images from the correspondent point features;
   refining point correspondence between the downscaled images based on affine transformation estimation using the triangular meshes;
   creating refined triangular meshes for the downscaled images from the refined point correspondence; and
   generating aligned coordinates through affine transformation based on the refined triangular meshes.

6. The method of claim 5, further comprising re-determining aligned coordinates between the downscaled images to control the number of aligned coordinates.

7. The method of claim 1, wherein (d) transforming the aligned coordinates to original image coordinates comprises:
   mapping the aligned coordinates back to original image coordinates in the pathology stain images at original resolutions and in original orientations;
   creating triangular meshes for the pathology stain images based on the mapped original image coordinates; and
   generating alignment data through affine mapping using the triangular meshes.

8. The method of claim 7, wherein generating alignment data comprises generating forward and backward mapping functions between the pathology stain images.

9. The method of claim 1, wherein the pathology stain images are selected from immunohistochemical (IHC) stain images and hematoxylin and eosin (H&E) stain images.

10. The method of claim 1, further comprising displaying corresponding areas of the pathology stain images based on the alignment data.

11. The method of claim 10, wherein the displaying comprises:
   determining the center position of one of the pathology stain images;
   transforming the center position to a corresponding coordinate another pathology stain image based on the alignment data; and
   moving the center position of the another pathology stain image to the corresponding coordinate.

12. A computer-implemented system for synchronized navigation in pathology stain images, comprising:
   a downscaler to detect tissue areas and downsample the pathology stain images;
   a rotation estimator to determine a rotation angle and rotate the downscaled images,
   wherein the rotation estimator is configured to;
      estimate the rotation between the downscaled images;
      rotate at least one of the downscaled images by the rotation angle such that the downscaled images are aligned in orientation;
      fill in background for the at least one rotated image; and
      compensate translation for the at least one rotated image;
   an alignment module to align the downscaled images to generate aligned coordinates; and
   a coordinate transformer to transform the aligned coordinates to original image coordinates in the pathology stain images to thereby generate alignment data.

13. The system of claim 12, further comprising a display system to display corresponding areas of the pathology stain images based on the alignment data.

14. The system of claim 13, wherein the system is configured to:
   identify the center position of a first one of the pathology stain images;

transform the center position to a corresponding coordinate in a second one of the pathology stain images based on the alignment data; and move the center position of the another pathology stain image to the corresponding coordinate.

15. The system of claim 12, further comprising a database to store alignment data.

16. The system of claim 12, wherein the downscaler is configured to:

detect tissue areas in the pathology stain images;

determine suitable resolutions for aligning the pathology stain images; and downscale the pathology stain images to the determined resolutions.

17. The system of claim 12, wherein the alignment module is configured to:

determine correspondent point features between the downscaled images;

create triangular meshes for the downscaled images from the correspondent point features; and generate aligned coordinates through affine transformation based on the triangular meshes.

18. The system of claim 12, wherein the coordinate transformer is configured to:

map the aligned coordinates back to original image coordinates in the pathology stain images at original resolutions and original orientations;

create triangular meshes for the pathology stain images based on the mapped original image coordinates; and generate alignment data through affine mapping using the triangular meshes.

* * * * *